(12) United States Patent
Henion et al.

(10) Patent No.: US 6,511,189 B1
(45) Date of Patent: Jan. 28, 2003

(54) INTERCHANGEABLE MIRROR SCALP FOR TRAILER TOWING

(76) Inventors: Paul R. Henion, 4965 Lakeshore Rd., Fort Gratiot, MI (US) 48059; Andrew Lettis, The Moorings, 21 Birdham Road, Donnington, Chichester, West Sussex, PO19 2TA (GB); Graham Rehill, 21 Marlet Close, Chichester, West Sussex PO19 2DF (GB); Ronald R. Raymo, Jr., 3667 W. Surrey Ln., Ft. Gratiot, MI (US) 48059

( * ) Notice: Subject to any disclaimer, the term of this patent is extended or adjusted under 35 U.S.C. 154(b) by 0 days.

(21) Appl. No.: 09/693,539

(22) Filed: Oct. 20, 2000

Related U.S. Application Data (60) Provisional application No. 60/208,510, filed on Jun. 1, 2000, and provisional application No. 60/460,737, filed on Oct. 20, 1999.

(51) Int. Cl.7 .............................. G02B 5/08; G02B 7/182
(52) U.S. Cl. ...................................... 359/850; 359/871
(58) Field of Search ................................ 359/850, 855, 359/864, 865, 866, 871

(56) References Cited

U.S. PATENT DOCUMENTS

| | | | |
|---|---|---|---|
| 4,253,738 A | | 3/1981 | Linkous |
| 4,892,400 A | * | 1/1990 | Brookes et al. ............. 359/865 |
| 4,892,401 A | * | 1/1990 | Kittridge et al. ............ 359/850 |
| 4,906,088 A | * | 3/1990 | Casey ......................... 359/865 |
| 4,921,340 A | | 5/1990 | Dyer |
| 4,927,255 A | | 5/1990 | Martinez |
| 5,005,962 A | | 4/1991 | Edelman |
| 5,296,973 A | * | 3/1994 | Burke ......................... 359/865 |
| 5,546,239 A | | 8/1996 | Lewis |
| 5,563,744 A | | 10/1996 | Matsumiya |
| 5,594,594 A | | 1/1997 | Ung |
| 5,760,978 A | | 6/1998 | Smith |
| 5,889,627 A | | 3/1999 | Englander et al. |
| 5,946,149 A | | 8/1999 | Hoffman |

* cited by examiner

*Primary Examiner*—Mark A. Robinson
(74) *Attorney, Agent, or Firm*—Warn, Burgess & Hoffmann, P.C.

(57) ABSTRACT

A vehicle side mirror that includes a forward scalp portion selectively removable from a forward side of the mirror housing. The scalp portion can be replaced with an extended auxiliary towing mirror scalp that conforms with the housing of the side mirror, and provides an extended auxiliary mirror attached thereto that is suitable for providing extended side viewing for towing purposes. In one particular embodiment, the towing scalp is interchangeable with an auxiliary turn signal light scalp to allow the towing vehicle to be readily converted to a suitable towing situation. In alternate embodiments, the towing mirror is slidably extendable from a support panel associated with a side mirror, or the tow mirror is pivotally extendable from a bottom surface of the side mirror.

4 Claims, 9 Drawing Sheets

INTERCHANGEABLE MIRROR SCALP FOR TRAILER TOWING

This application claims benefit of provisional application No. 60/460,737 filed Oct. 20, 1999 which claim benefit of Ser. No. 60,208,570 filed Jun. 1, 2000.

BACKGROUND OF THE INVENTION

1. Field of the Invention

This invention relates generally to an extended side mirror of a vehicle for accommodating trailer towing and, more particularly, to an interchangeable mirror scalp connectable to an existing vehicle side mirror that provide a trailer towing mirror while maintaining an aesthetically mirror appearance.

2. Discussion of the Related Art

Vehicle side mirrors are typically provided on both sides of a motor vehicle that extend away form the side of the vehicle to give a vehicle operator right and left side rear views for lane changing and the like. Many different styles and designs exist in the art for such side mirrors. One particular design, is disclosed in U.S. Pat. No. 6,250,785, issued Jun. 26, 2001, entitled "Exterior Rear View Mirror Integral Warning Light", incorporated herein by reference, and assigned to the Assignee of this application. In that application, aesthetically contoured side mirrors are disclosed that include a mirror scalp removably attached to a forward portion of the side mirrors that include an auxiliary lane change indicator light connected thereto. The indicator light is connected to an extended edge of the mirror, to be readily visible to other vehicles.

The extended indicator light is integrated into a removable decorative covering which is secured to the mirror housing. A pigtail is provided for connecting the light to a wiring harness within the mirror housing. The indicator light is positioned on the outer surface of the vehicle's exterior side mirrors in such a manner so as to be visible throughout an arc extending about 90 degrees rearwardly from a line extending generally perpendicular to the longitudinal axis of the vehicle. In this manner, maximum visibility of the auxiliary indicator light is provided to other vehicles coming along side the vehicle, while still preventing the emitted light from being visible to the vehicle operator or oncoming traffic.

Certain vehicles are equipped with tow bars and the like to tow trailers, campers, boats, mobile homes, etc. Sometimes these towed vehicles are so wide that the existing side view mirrors on the vehicle do not extend out far enough to allow the vehicle operator to see around the towed vehicle. Therefore, it is heretofore been known in the art to equip the towing vehicle with auxiliary side mirrors that extend far enough from the sides of the vehicle to allow the vehicle operator to adequately see around the vehicle being towed. Typically, these auxiliary extended mirrors are after-market products that are bolted or attached to the side of the vehicle, and affect the appearance and aerodynamics of the vehicle.

What is needed is a more aesthetically pleasing trailer towing side mirror that can be attached to existing mirrors for trailer towing purposes. It is, therefore, an object of the present invention to provide such a mirror.

SUMMARY OF THE INVENTION

In accordance with the teachings of the present invention, a vehicle side mirror is disclosed that includes a forward scalp portion selectively removable from a forward side of the mirror housing. The scalp portion can be replaced with an extended auxiliary towing mirror scalp that conforms with the housing of the side mirror, and provides an extended auxiliary mirror attached thereto that is suitable for providing extended side viewing for towing purposes. In one particular embodiment, the towing scalp is interchangeable with an auxiliary turn signal light scalp to allow the towing vehicle to be readily converted to a suitable towing situation. In alternate embodiments, a towing mirror assembly is slidably extendable from an end of the side mirror, or is a towing mirror assembly pivotally extendable from a bottom surface of the side mirror.

In another embodiment, a spotter scalp is interchangeable with an auxiliary turn signal scalp to allow for towing and extended viewing from one side mirror. The spotter scalp incorporates the warning signal, thereby allowing the spotter scalp to be fully operable. In alternate embodiments, the spotter/signal scalp assembly has the signal display directly on the spotter glass, or the signal is incorporated on the scalp adjacent to the spotter glass. An additional embodiment of the spotter glass is the incorporation of a spotter mirror on the inboard portion of the main viewing glass.

Additional objects, features and advantages of the present invention will become apparent from the following description and appended claims, taken in conjunction with the accompanying drawings.

DETAILED DESCRIPTION OF THE PREFERRED EMBODIMENTS

The following discussion of the preferred embodiments directed to a side mirror of a vehicle including an auxiliary towing spotter mirror is merely exemplary in nature, and is in no way intended to limit the invention or its applications or uses.

Referring now to the drawings and in particular FIGS. 1–4, there is shown an exterior rear view mirror assembly 10 installed on a door 12 of a motor vehicle 14. The mirror assembly 10 is of the typical break away design, and includes a housing 16 pivotally supported on an arm 18 extending outwardly from a generally triangularly shaped mounting plate 20. The housing 16 may be of any desired shape, and includes an upper wall portion 22, a lower wall portion 24, a forwardly facing wall portion 26 and inner and outer wall portions 28 and 30, all of which merge together in a smooth manner so as to present a pleasing appearance.

The rearwardly facing portion of the housing 16 is open, and is adapted to receive a reflective mirror 32. The mirror 32 may be any suitable type, such as a flat, concave or convex mirror, or the type which automatically adjusts to reduce glare. A suitable shaped support member (not shown) is secured within the housing 16 and serves to movably support the mirror 32 within the opening. The support member may include suitable drive motors or the like for remote control adjustment of the mirror 32, as well as a device for heating the mirror 32 if desired. As thus far described, the mirror assembly 10 is typical to the existing side view mirror assemblies currently employed on various motor vehicles.

The housing 16 also contains a recessed portion 34 extending over at least a part of the upper, inner, outer and forwardly facing portions 22, 28, 30 and 26 that is adapted to receive a decorative towing scalp mirror assembly 36. The mirror assembly 36 may be chrome or colored to match the vehicle, or have some other finish to provide an aesthetically pleasing appearance. The mirror assembly 36 includes a decorative cover member portion 38 and an extended mirror portion 40. The extended portion 40 can have any suitable shape, and be suitably extended in any design that allows it to be supported by the housing 16 and accommodate trailers and the like of different widths. The extended portion 40 includes a rearwardly extended recessed portion that is configured to accept a convex spot mirror 44 that extends from the side wall portion 30 of the housing 16.

Figure 1:
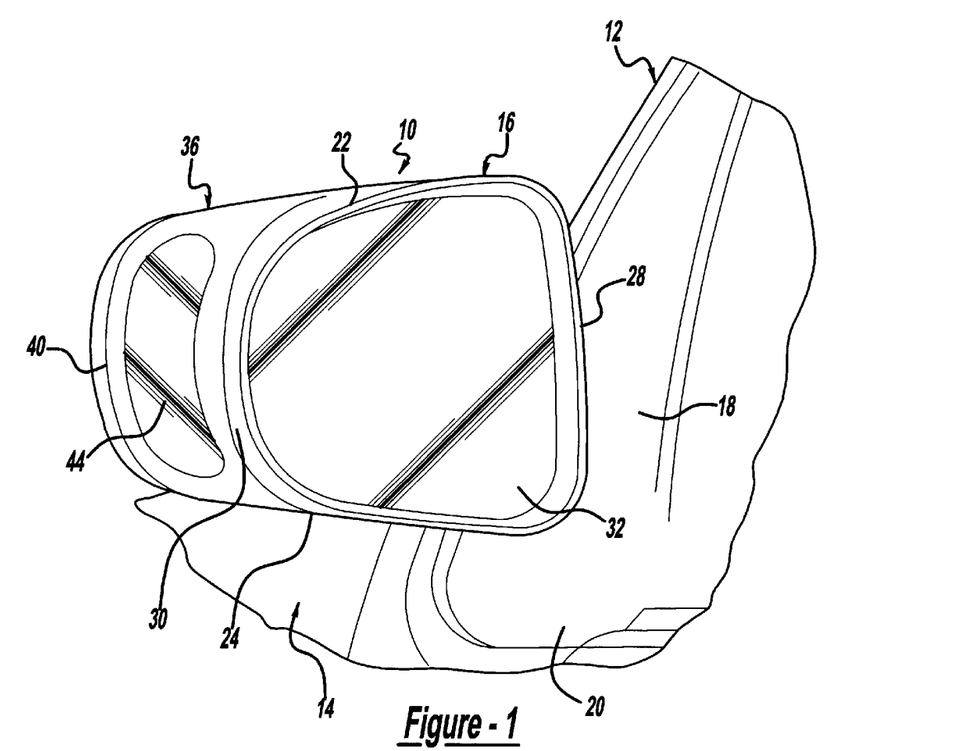
FIG. 1 is a perspective view of a side mirror attached to a vehicle, and including an auxiliary towing mirror scalp, according to an embodiment of the present invention.
Figure 2:
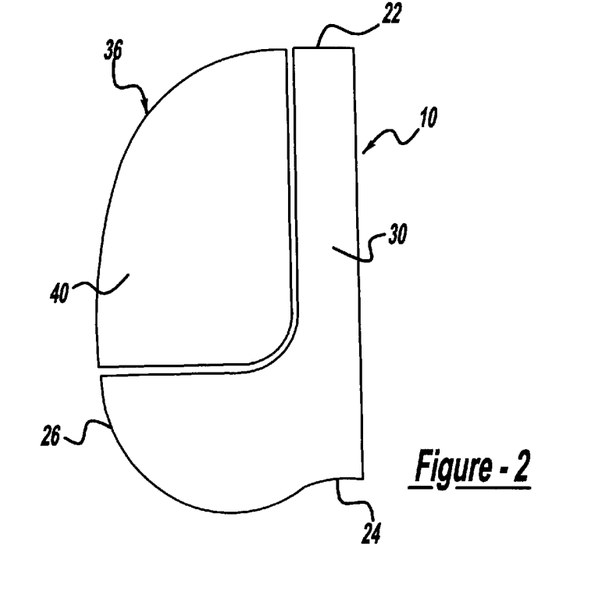
FIG. 2 is an end view of the mirror shown in FIG. 1.
Figure 3:
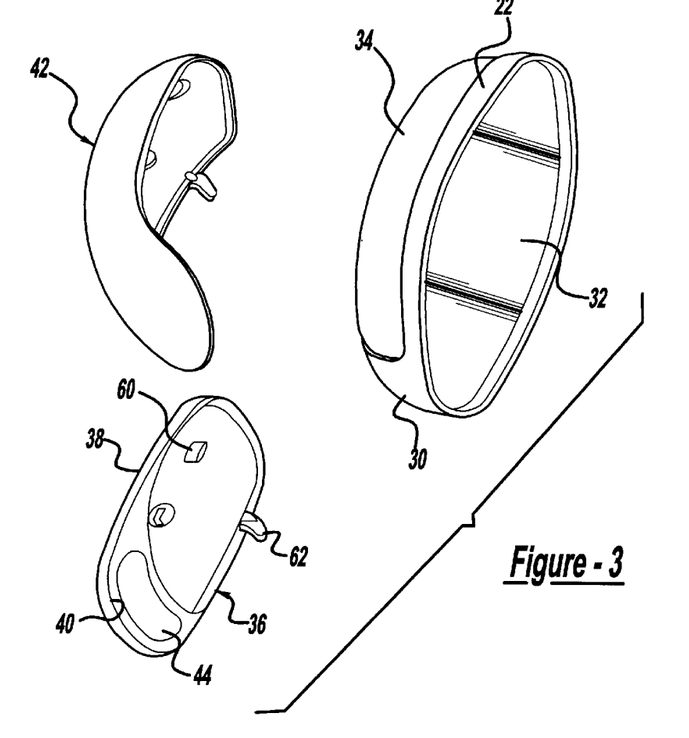
FIG. 3 is an exploded view showing that the towing mirror scalp of the invention can replace an existing decorative scalp on the mirror.

As particularly shown in FIG. 3, the scalp mirror assembly 36 is selectively interchangeable with a decorative scalp member 42 so that the decorative scalp member 42 can be removed and replaced with the towing scalp mirror assembly 36 when its use is necessary. Also, the scalp mirror assembly 36 can be interchangeable with the auxiliary warning light assembly disclosed in the '866 patent application.

Figure 4:
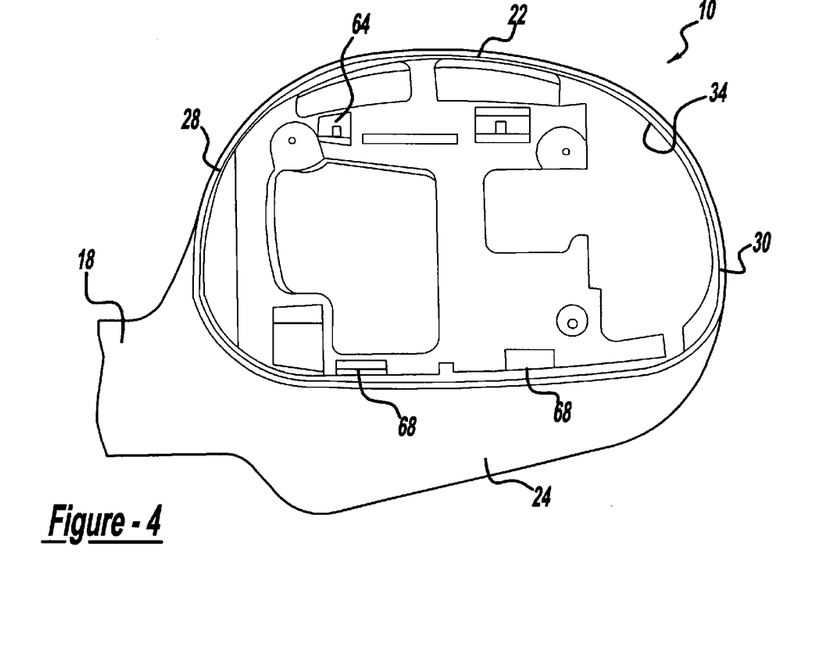
FIG. 4 is a back view of the mirror shown in FIG. 1 with the towing scalp of the invention removed therefrom.

As also shown in FIG. 3, the scalp assembly 36 is provided with a plurality of outwardly extending tabs 60 and tangs 62. FIG. 4 is a back view of the housing 16 with the scalp assembly 36 removed. According to one embodiment, the tabs 60 are inserted into slots 64 to appropriately align the assembly 36, and the tangs 62 are inserted into openings 68 to be connected with extended tabs (not shown) in a snap fit engagement. This allows the assembly 36 to be secured to the housing 16 in an efficient and easy manner, and to be replaced with other decorative members, such as the scalp disclosed in the '866 patent application.

Figure 5A:
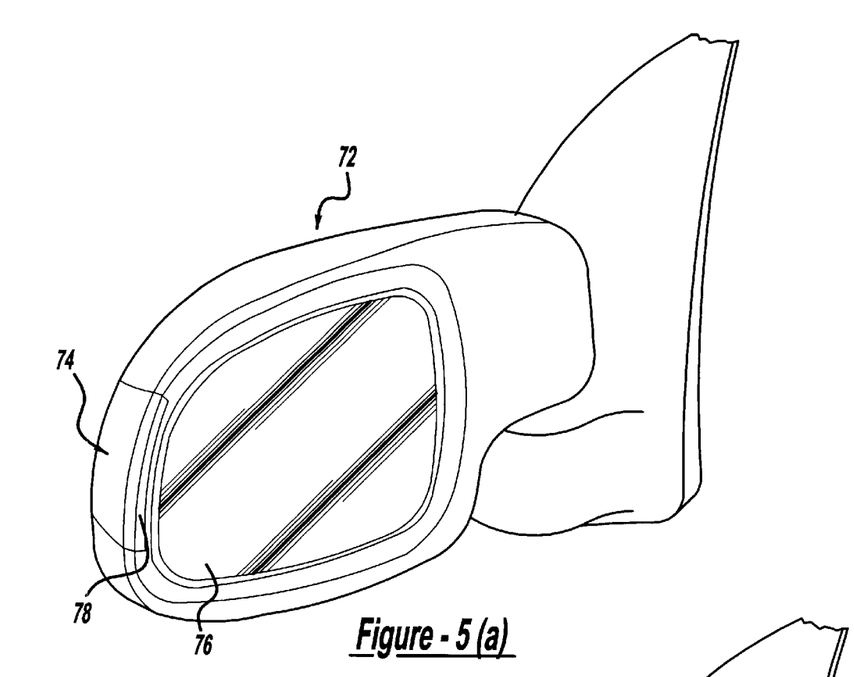
FIGS. 5(a) and 5(b) are perspective views of a side mirror of a vehicle including an extendable auxiliary towing mirror assembly in a stowed state and an extended state, respectively, according to another embodiment of the present invention.
Figure 5B:
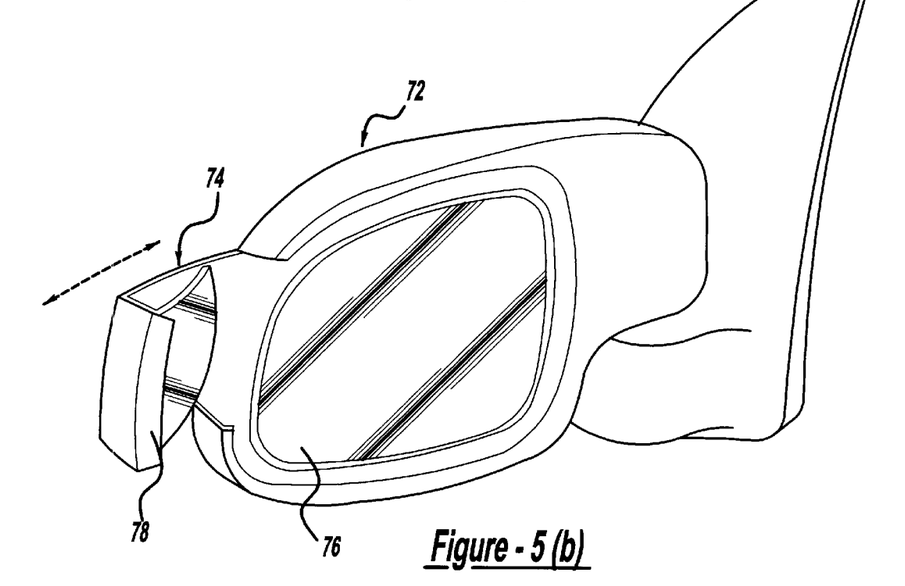

FIGS. 5(a) and 5(b) show a vehicle side mirror assembly 72 including an extended auxiliary towing mirror assembly 74, according to another embodiment of the present invention. The side mirror assembly 72 includes a mirror 74 for normal side rear viewing. The auxiliary towing mirror assembly 74 includes a convex spot mirror 78 for rear viewing during towing. The mirror assembly 74 is shown in a retracted position in FIG. 5(a) and in an extended position in FIG. 5(b) for use during the towing situation.

Figure 6:
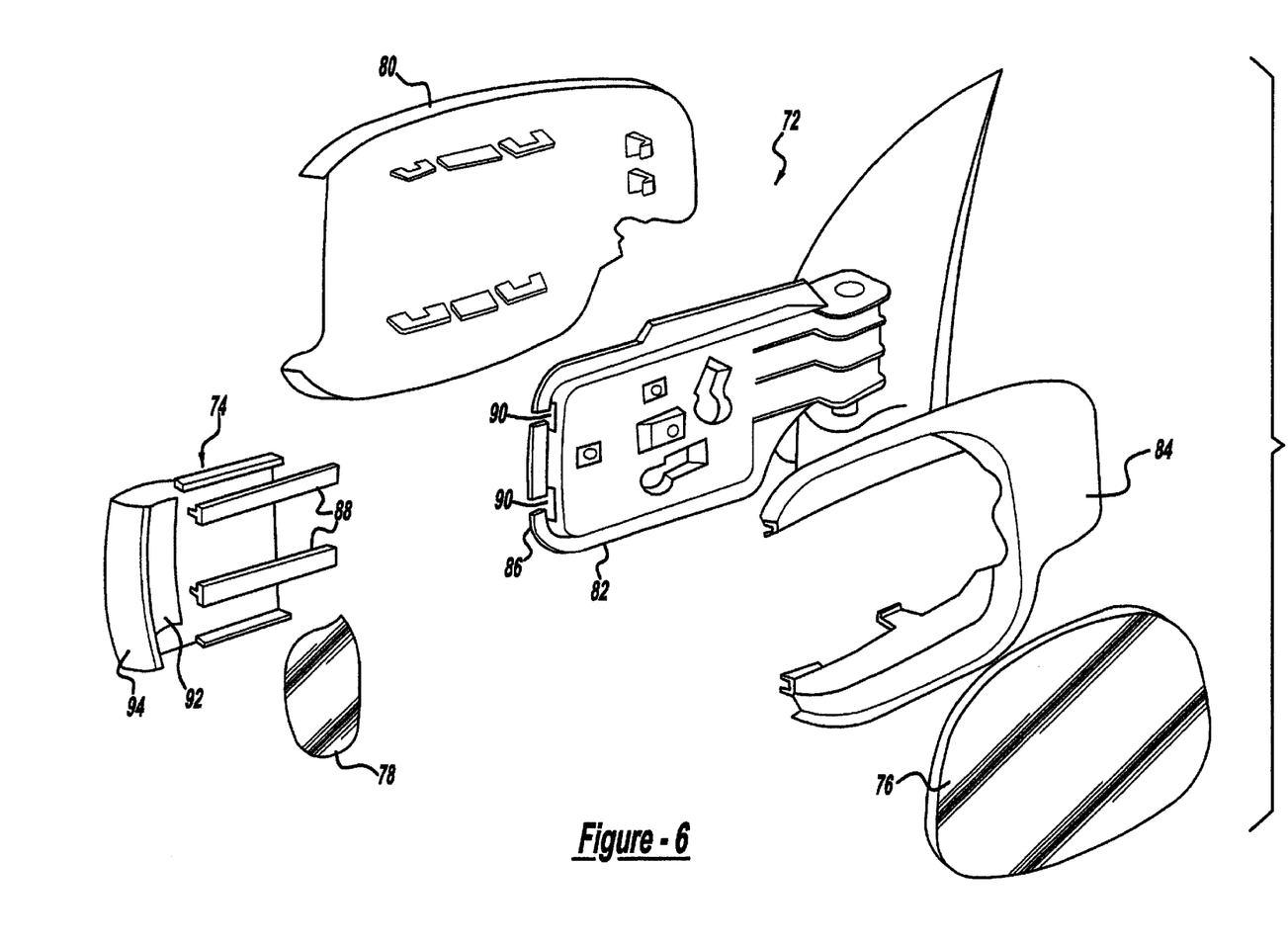
FIG. 6 is an exploded view of the mirror shown in FIGS. 5(a) and 5(b)

FIG. 6 shows an exploded perspective view of the side mirror assembly 72. The side mirror assembly 72 includes a forward panel 80, a support panel 82 connected to the vehicle, a decorative panel 84, and the mirror 76 all being securable together in snap fit engagement, as shown. Any suitable tab and slot configuration can be used to assemble the assembly 72. The assembly 74 is slidably attached to a side edge 86 of the support panel 82. The assembly 74 includes two parallel tracks 88 that slidably engage with slots 90 in the support panel 82. The convex mirror 78 mounts within an opening 92 in the assembly 72. An edge piece 94 of the assembly 74 allows the assembly 74 to be readily grasped so that it can be slid out for towing and in for stowing.

Figure 7:
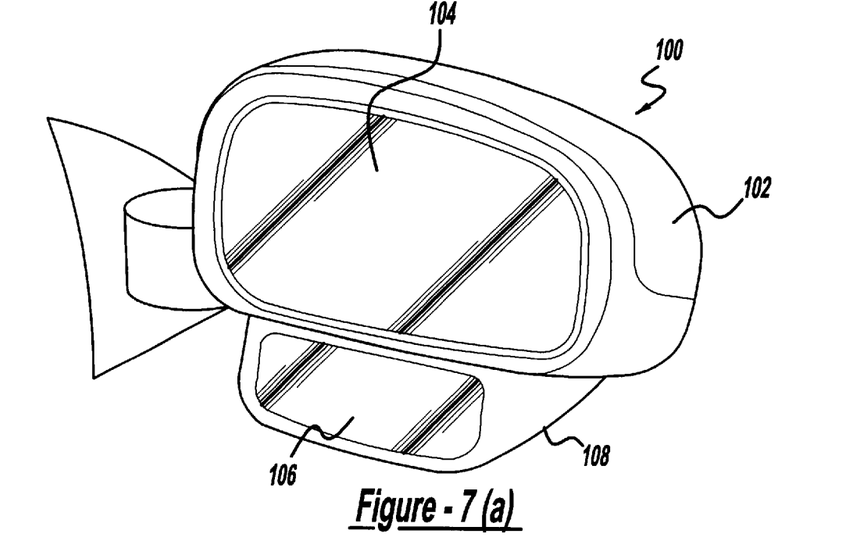
FIG. 7(a) is a perspective view of a vehicle side mirror including a pivotal auxiliary towing mirror, according to another embodiment of the present invention.
FIGS. 7(b) and 7(c) are cross-sectional views of the side mirror shown in FIG. 7(a) with the towing mirror in a stowed state and an extended state, respectively.

FIG. 7(a) shows a side mirror assembly 100 including a mirror housing 102, a mirror 104 and a wide angle mirror 106, according to another embodiment of the present invention. FIGS. 7(b) and 7(c) show cross-sectional views of the assembly 100. The wide angle mirror 106 is mounted within a mirror housing 108 that is pivotally mounted to the housing 102 on a rod 110 at a pivot location. FIG. 7(b) shows the housing 108 in a retracted position where it is positioned within the housing 102. FIG. 7(c) shows the housing 108 in an extended position where the mirror 106 extends below the housing 102 to allow a wide angle view for towing purposes.

Figure 8:
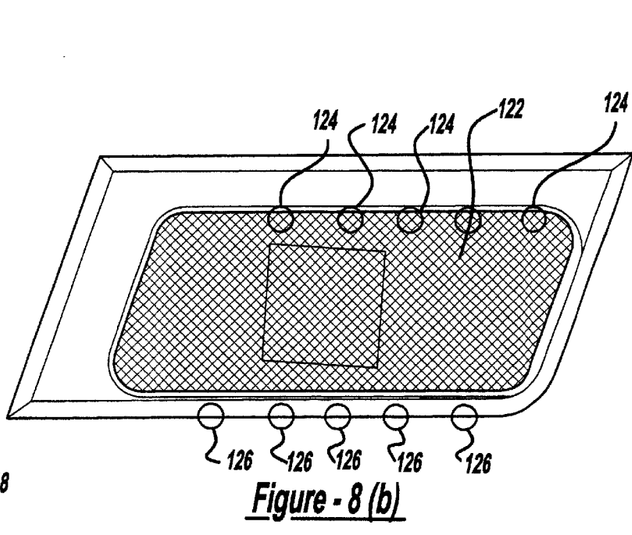
FIGS. 8(a) and 8(b) are two views of a wide angle towing mirror separated from the side mirror of the vehicle, according to another embodiment of the present invention.

FIGS. 8(a) and 8(b) show another embodiment of a wide angle mirror assembly 116 that can be used with a side mirror assembly of the invention. The wide angle mirror assembly 116 includes a T-shaped track 118 that allows it to be slidably positioned within a corresponding opening in the mirror assembly. Additionally, a spring 120 secured to a top portion of the assembly 116 allows the wide angle assembly 116 to be attached to the side mirror assembly in the spring attaching engagement.

FIG. 8(b) shows a rear view of the mirror assembly 116. The assembly may include a signal light 122 and/or LEDs 124 for appropriate signaling of the vehicle. LEDs 126 may also be used at the base for approach lights or the like.

Thus, in accordance with this embodiment, the mirror can be placed in a suitable slot in the side of a mirror housing using "T" track 118 for towing purposes. Alternatively, it could be stowed under a mirror by use of the spring clip sliding into a suitable slot in the underside of the mirror.

Figure 9:
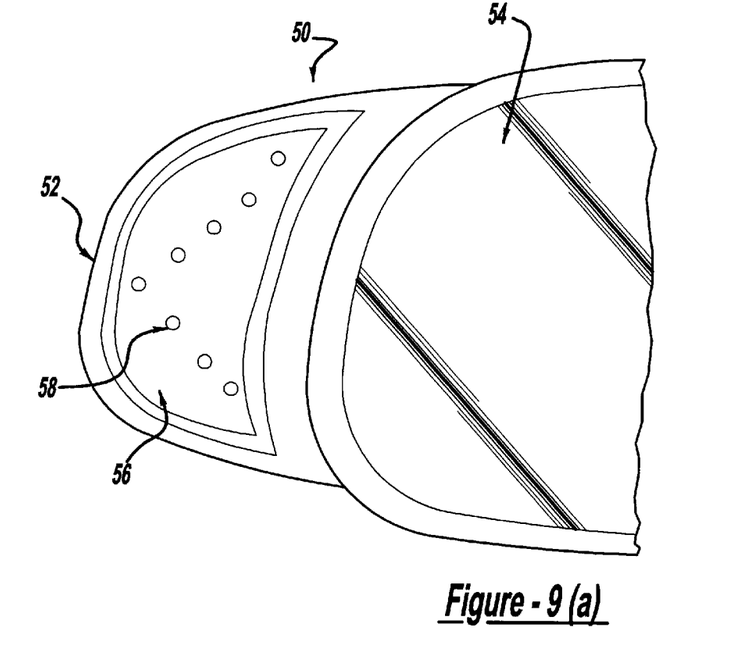
FIG. 9(a) is a perspective view of a side mirror incorporating a towing spotter mirror scalp.
FIG. 9(b) is a side perspective view of FIG. 9(a) detailing the spotter glass configuration.

FIG. 9(a) shows a vehicle side mirror assembly 50 including an extended auxiliary towing mirror assembly 52, according to another embodiment of the present invention. The side mirror assembly 50 includes a mirror 54 for normal side rear viewing. The auxiliary towing mirror assembly 52 includes a spot mirror 56 for rear viewing during towing as well as a warning signal indicator 58 incorporated within the spot mirror 56. The warning signal indicator 58 is incorporated within the spot mirror 56 of the auxiliary towing mirror assembly 52 by the use of muth signal glass in the spot mirror 56 as well as an L.E.D. FIG. 9(b) is a side perspective view of FIG. 9(a) detailing the spot mirror profile. As can be seen in FIG. 9(b), the incorporation of the sport mirror 56 within the auxiliary towing mirror assembly 52 provides only a portion of the mirror 56 to be usable. It is within this usable portion of the spot mirror 56 that the warning signal indicator 58 is incorporated.

Figure 10:
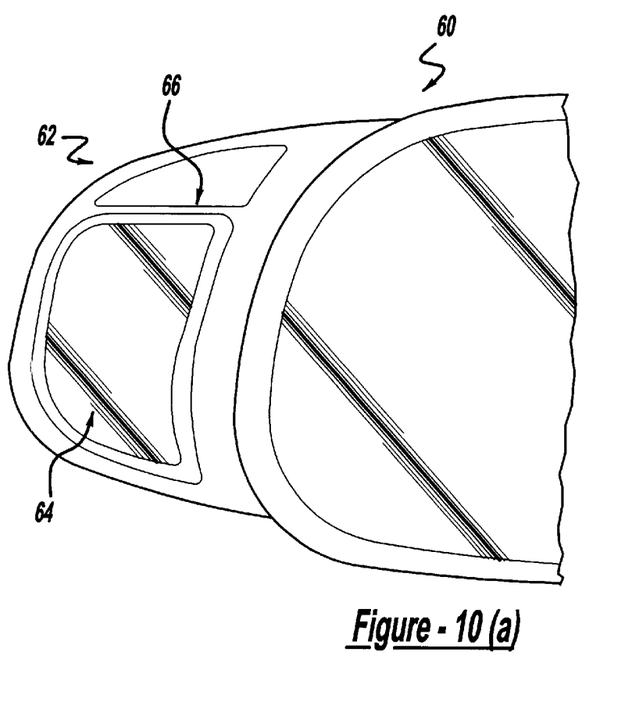
FIG. 10(a) is a perspective view of a vehicle side mirror incorporating a towing spotter/signal scalp, according to another embodiment of the present invention.
FIG. 10(b) is a side perspective view of FIG. 10(a) detailing the spotter glass and signal configuration.

FIG. 10(*a*) shows a vehicle side mirror assembly 60 including an extended auxiliary towing mirror assembly 62, according to another embodiment of the present invention. The auxiliary towing mirror assembly 62 includes a spotter glass portion 66 and a warning signal indicator 64. The warning signal indicator 64 is located above the spotter glass portion 66. The spotter glass portion 66 and warning signal indicator 64 are incorporated within the auxiliary towing mirror assembly 62 and is interchangeable with a decorative scalp assembly. FIG. 10(*b*) provides a side perspective view of the auxiliary towing mirror assembly 62 showing a detailed view of the spotter glass portion 66 and warning signal indicator 64. assembly. FIG. 10(*a*) provides a side perspective view of the auxiliary towing mirror assembly showing a detailed view of the spotter glass and warning signal indicator.

Figure 11:
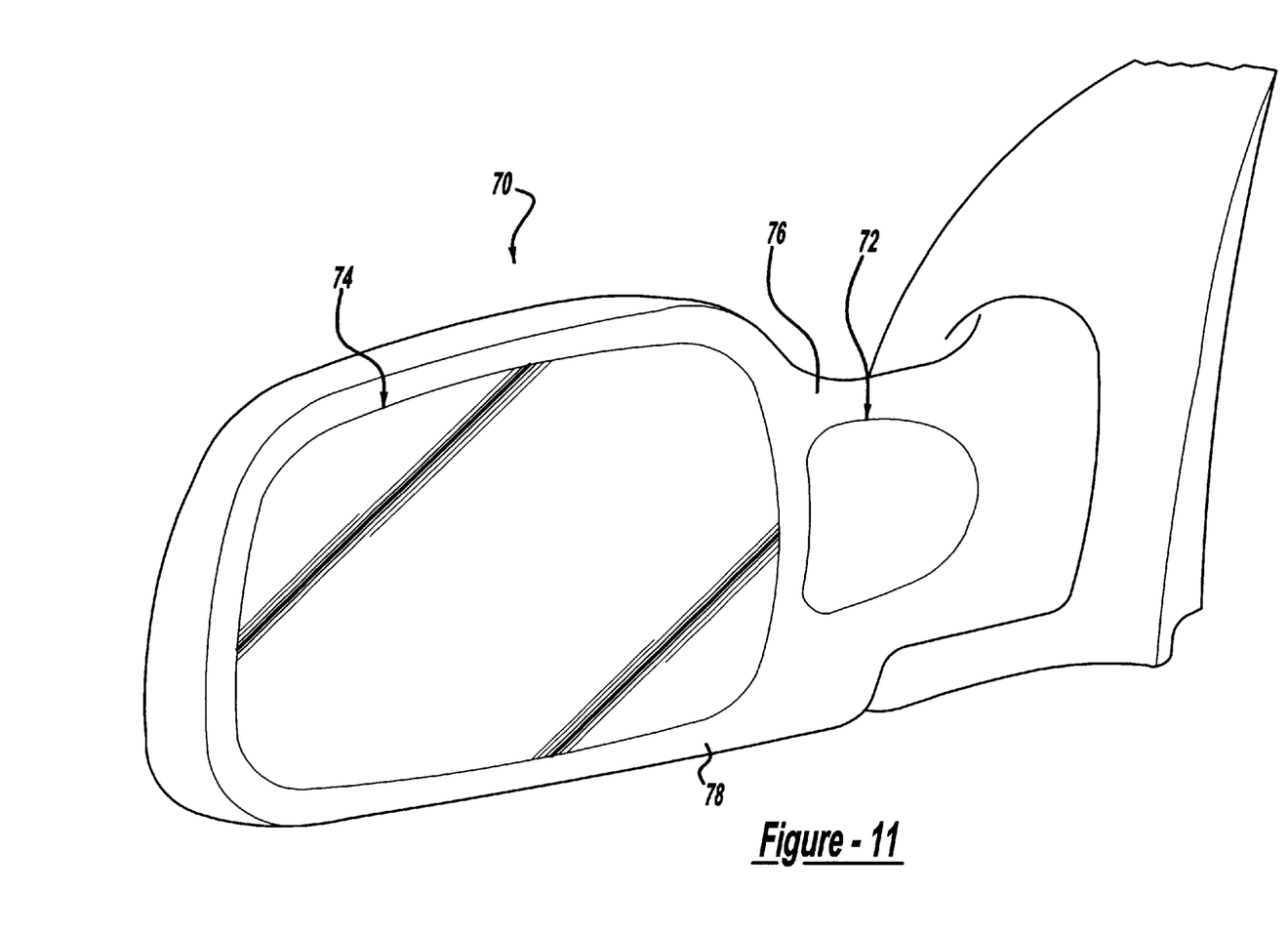
FIG. 11 is a perspective view of a side mirror incorporating an inboard spotter mirror, according to another embodiment of the present invention.

FIG. 11 shows a perspective view of a vehicle side mirror assembly 70 incorporating a spot mirror 72 inboard of the main viewing glass 74. The spot mirror 72 is located on an extended arm 76 which pivotally supports a housing 78 which provides the main viewing glass 74. The spot mirror 72 may have a variety of configurations, with a preferred embodiment having approximately a height of 3 inches and a width of 3 inches. The spot mirror 72, similar to the main viewing glass 74, may be fixed in position or recessed within the extended arm 76 of the mirror assembly 70 to allow slight rotation of the spot mirror 72. This further allows for enhanced visibility when using the spot mirror 72.

The foregoing discloses and describes merely exemplary embodiments of the present invention. One skilled in the art will readily recognize from such discussion and from the accompanying drawings and claims, that various changes, modifications or variations can be made therein without departing from the spirit and scope of the invention as defined in the following claims.

What is claimed is:

1. A side view mirror assembly for a vehicle, said assembly comprising:

a housing configured to be secured to the vehicle, said housing defining an enclosure including an outer wall having a forwardly facing portion positioned within a forward opening in the outer wall, where the forwardly facing portion forms a smooth transition with the outer wall, and a generally rearwardly facing opening;

a first reflective mirror disposed within the rearwardly facing opening; and an auxiliary mirror assembly, said auxiliary mirror assembly including a decorative cover member releasably secured to the housing and including a scalp portion forming the forwardly facing portion of the outer wall opposite to said first reflective mirror, wherein the inside of the enclosure is exposed through the forward opening if the auxiliary mirror assembly is removed from the housing, said auxiliary mirror assembly further including an extended portion integral with the cover member and including a rearwardly facing opening, said extended portion including a second reflective mirror disposed within the opening of the extended portion.

2. The assembly according to claim 1 wherein the decorative cover member includes a plurality of tabs that selectively lock with openings in the housing to secure the auxiliary mirror assembly to the housing in a removable engagement.

3. A mirror assembly comprising:

a housing having an inner side, outer side, upper side and lower side all defining an enclosure having an outer wall, said outer wall having a forwardly facing portion positioned within a forward opening in the outer wall, where the forwardly facing portion forms a smooth transition with the outer wall;

a rearward facing opening disposed within said housing on an inner surface;

a first reflective mirror disposed within said rearward facing opening; and an auxiliary mirror assembly releasably secured to the housing, the auxiliary mirror assembly including an extended portion and a scalp portion being integral therewith, said scalp portion forming the forwardly facing portion of the outer wall opposite to the first mirror, wherein the inside of the enclosure is exposed through the forward opening if the auxiliary mirror assembly is removed from the housing, said extended portion including a second reflective mirror for providing an operator additional views when using said side mirror assembly.

4. The assembly according to claim 3 wherein the scalp portion includes a plurality of tabs that selectively lock with openings in the housing to secure the auxiliary mirror assembly to the housing in a removable engagement.

* * * * *

UNITED STATES PATENT AND TRADEMARK OFFICE
CERTIFICATE OF CORRECTION

PATENT NO. : 6,511,189 B1
DATED : January 28, 2003
INVENTOR(S) : Paul Henion et al.

It is certified that error appears in the above-identified patent and that said Letters Patent is hereby corrected as shown below:

Title page,
Item [73], Assignee, please add: -- Schefenacker Vision Systems USA Inc., Marysville, MI (US) --.

Column 1,
Line 5, "60/460,737" should be -- 60/160,737 --.
Line 14, "provide" should be -- provides --.
Line 19, "form" should be -- from --.
Line 23, "design," should be -- design --.

Column 5
Line 15, delete "assembly. FIG 10(a) provides a side perspective view of the auxiliary towing mirror assembly showing a detailed view of the spotter glass and warning signal indicator."

Signed and Sealed this

Fifteenth Day of February, 2005

JON W. DUDAS
*Director of the United States Patent and Trademark Office*